United States Patent [19]

Hurnik et al.

[11] Patent Number: 4,714,568

[45] Date of Patent: Dec. 22, 1987

[54] NEW BLOWING AGENT COMBINATION BASED ON AZODICARBONAMIDE, PRODUCTION THEREOF AND USE THEREOF FOR FOAMING POLYMERS

[75] Inventors: Helmut Hurnik, Leverkusen; Manfred Finzenhagen, Cologne; Werner Jeblick, Leverkusen, all of Fed. Rep. of Germany

[73] Assignee: Bayer Aktiengesellschaft, Leverkusen, Fed. Rep. of Germany

[21] Appl. No.: 663,896

[22] Filed: Oct. 23, 1984

Related U.S. Application Data

[63] Continuation-in-part of Ser. No. 486,070, Apr. 18, 1983, abandoned.

[30] Foreign Application Priority Data

| | | |
|---|---|---|
| Apr. 28, 1982 [DE] | Fed. Rep. of Germany | 3215835 |
| Apr. 14, 1983 [EP] | European Pat. Off. | 83 103 589.4 |
| Apr. 25, 1983 [JP] | Japan | 58-71547 |
| Apr. 26, 1983 [CA] | Canada | 426758 |
| Apr. 27, 1983 [ES] | Spain | 521885 |

[51] Int. Cl.$^4$ .............................................. C09K 3/00
[52] U.S. Cl. ....................... 252/350; 521/85; 521/89; 521/92; 521/93; 521/94; 521/79; 521/97; 521/909
[58] Field of Search ............... 252/350; 521/92, 93, 521/94, 79, 89, 85, 97

[56] References Cited

U.S. PATENT DOCUMENTS

| | | | |
|---|---|---|---|
| 3,901,835 | 8/1975 | Pailla | 521/79 |
| 3,962,154 | 6/1976 | Elgi | 521/79 |
| 4,029,612 | 6/1977 | Collington | 521/79 |
| 4,384,048 | 5/1983 | Bathgate | 521/73 |

FOREIGN PATENT DOCUMENTS

| | | |
|---|---|---|
| 0980950 | 12/1975 | Canada . |
| 0037188 | 10/1981 | European Pat. Off. . |
| 2285424 | 4/1976 | France . |
| 2384815 | 10/1978 | France . |
| 1522513 | 8/1978 | United Kingdom . |

*Primary Examiner*—Morton Foelak
*Attorney, Agent, or Firm*—Connolly and Hutz

[57] ABSTRACT

The invention relates to a new blowing agent combination based on azodicarbonamide, production thereof and use thereof for foaming polymers.

6 Claims, No Drawings

NEW BLOWING AGENT COMBINATION BASED ON AZODICARBONAMIDE, PRODUCTION THEREOF AND USE THEREOF FOR FOAMING POLYMERS

This application is a continuation-in-part of application Ser. No. 486,070, filed Apr. 18, 1983, now abandoned.

This invention relates to new blowing agent combinations based on azodicarbonamide with the addition of surface active agents and metal compounds, to the production thereof and to the use thereof in the production of cellular and porous articles, such as foams of thermoplastic polymers.

It is known that foamed products may be produced from organic polymeric materials by the decomposition of a blowing agent which has been incorporated within the polymer or applied by screen over the surface of the polymer granulate. These blowing agents undergo controlled decomposition above a certain temperature to split off a blowing gas and form a residue which remains in the foam. Substances from various types of compounds have been described for this purpose in the literature, for example azo compounds, hydrazides, semicarbazides, triazoles, tetrazoles, N-nitroso compounds, and benzoxazines, (Kunststoffe 66 (1976) 10 pages 698–701).

Amide derivatives of azodicarboxylic acid generally fulfil these conditions. Azodicarbonamide (ADC) is particularly suitable by virtue of its excellent stability, high decomposition temperature and advantageous decomposition characteristics and on account of the relatively large volume of gas split off per unit weight. In addition, the liberated gases consist for the most part of nitrogen while the decomposition residues are to a large extend colourless and odourless.

The azodicarbonamide may be mixed with various additives according to the polymer to be foamed, for example additives to lower the decomposition temperature or additives which have an advantageous effect on the pore structure and/or the colour of the foam produced.

The additives may include, for example, zinc salts used alone or mixed with other heavy metals, such as salts of lead, tin or cadmium, and especially chromium compounds, such as chromates or chromium salts which are highly effective, for example, for the production of cross-linked polyethylene foams, foam rubber or polyvinyl chloride foams (e.g. German Auslegeschrift Nos. 1,936,098 and 2,653,746, EP-A No. 00 27 688).

It is also known, for example, that the addition of magnesium oxide may have an advantageous effect on foaming (German Auslegeschrift Nos. 2,852,287 and 2,351,515). The addition of zinc compounds in combination with Al, Sn, B and Si compounds to the blowing agent, for example, has also been described (JP-A No. 49-70931 (74-70931)).

It has now been found that particularly advantageous technological effects are obtained by doping azodicarbonamide with one or more surface-active agents and compounds of boron, molybdenum, zinc, chromium, nickel, manganese and/or titanium, singly or as mixtures.

The surface-active auxiliaries used may be silicone oils, defoaming agents, paraffin oil, fatty acids, dispersing agents, emulsifiers, soaps, detergents and raw materials for detergents, and ionic and non-ionic surface active agents, such as fluorine compounds.

The following are mentioned as examples: various viscous silicone oils, silicone defoamers, tributylphosphate, condensation products of oils with propylene oxide and ethylene oxide, heating bath oil, common heating bath oil, waxes, stearic acid, palmitic acid, capric acid, lauric acid, oleic acid and salts thereof, e.g. alkali metal salts, such as sodium and potassium salts, ammonium salts or alkaline earth metal salts, such as calcium, magnesium and barium salts, corresponding salts of alkyl sulphonic acids, alkylphenol polyglycol ethers, quaternary ammonium salts, such as benzyl dodecyldimethylammonium chloride, substituted naphthalene sulphonates, substituted polyglycol ethers, and alkali metal, alkaline earth metal and ammonium salts of perfluoroalkane sulphonic acids and perfluoroalkane carboxylic acids.

The surface active fluorine compounds are preferably used alone or in combination with fatty acids, a combination of perfluoroalkanoic acid salts with fatty acids having from 14 to 22 carbon atoms being particularly preferred.

The perfluoroalkanoic acid salts which may be used according to the present invention correspond to the following general formula (I):

$$C_nF_{n+1}X^{\ominus}M^{\oplus} \qquad (I)$$

wherein
n represents an integer of from 1 to 10, preferably 8;
X represents an $SO_3$ or $COO$ group; and
M represents an alkali metal or alkaline earth metal ion or ammonium ion corresponding to the following general formula (II):

$$\left[\begin{array}{c} R \\ | \\ R-N-R \\ | \\ R \end{array}\right]^{\oplus} \qquad (II)$$

wherein
R independently represents an alkyl group having from 1 to 10 carbon atoms; preferably tetraethylammonium or potassium The alkali metal may be sodium or potassium and the alkaline earth metal may be magnesium or calcium.

The fatty acids used correspond to the following general formula (III):

$$C_nH_{2n+1}COOM \text{ or } C_nH_{2n-1}COOM \qquad (III)$$

wherein
n represents an integer of from 7 to 25, preferably from 13 to 21; and
M represents hydrogen, sodium, potassium, ammonium, ½ magnesium, ½ calcium or ½ barium, preferably hydrogen or sodium.

The use of surface-active agents improves the pouring or flow characteristics of azodicarbonamide (ADC), as well as facilitating the incorporation and distribution of the blowing agent in polymers. It also enables a very fine and uniform pore structure to be obtained in the finished foam.

The surface-active agent is generally used in quantities of from 0.0001 to 2%, by weight, based on the weight of azodicarbonamide. It is preferably used in quantities of from 0.001 to 1.0%, by weight, most preferably from 0.005 to 0.5%, by weight.

When the additives according to the present invention are used the average grain size of the ADC may vary from 5 to 55μ.

According to the present invention, metal compounds are also added to the blowing agent. These include compounds of boron, molybdenum, tungsten, zinc, chromium, nickel, manganese, tin and titanium. They may be used singly or as mixtures.

The following are examples of suitable metal compounds: boric acid, sodium borates, calcium borate, boron trioxide, perborates, such as sodium perborate or zinc perborate, zinc borate, molybdenum oxide, sodium molybdate, ammonium molybdate, potassium molybdate, tungstic oxide, tungstic acid, sodium tungstate, calcium tungstate, ammonium tungstate, zinc oxide, zinc sulphate, zinc chloride, zinc nitrate, zinc bromide, nickel sulphate, nickel oxide, nickel chloride, nickel nitrate, manganese oxides, manganese chlorides, maganese sulphates, manganese nitrates, sodium, potassium and ammonium manganates, sodium, potassium and ammonium permanganates, tin chloride, tin oxide, tin dioxide, sodium and potassium stannates, titanium dioxide, sodium titanate, calcium titanate, titanium sulphate, titanium oxysulphate, titanium peroxy sulphate and titanium chlorides.

The metal compounds are generally added in quantities of from 0.0001 to 2%, by weight, based on the quantity of azodicarbonamide put into the process, and preferably in quantities of from 0.01 to 1%, by weight, most preferably from 0.2 to 0.6%, by weight.

The blowing agent combination according to the present invention, comprising azodicarbonamide (ADC) surface-active agent and metal compound, may be used, for example, for foaming polymers, such as thermoplastic polymers. It is preferably used for foaming thermoplastic polymers which are subsequently to be processed at temperatures of from 140° to 350° C., the particular process temperature depending on the thermoplast used.

The following are examples of suitable thermoplasts: polyvinyl chloride, polyethylene, polypropylene, copolymers of vinyl chloride (VC)/vinyl acetate (VAC), VC/ethylene vinyl acetate (EVAC), ethylene (E)/VC, propylene/VC, E/VAC, ethylene, propylene, polystyrenes, polyamides, polysulphones, polyethylene-polypropylene (PETP), polybutylene terephthalate (PBT), polyphenylene oxide (PPO), polyacrylates, rubbers, plastics based on cellulose esters, acrylonitrile-butadiene-styrene polymers (ABS), mixtures of polysulphone and styrene-acrylonitrile or ABS polymers, mixtures of PVC and ABS polymers or acrylonitrile polymers, polymeric mixtures, and mixtures of the above-mentioned polymers.

The blowing agent combination according to the present invention is preferably used for the production of polyolefin foams, especially polyethylene foams.

The blowing agent combination according to the present invention is added in the conventional quantities to the polymer which is to be processed. The polymer to be processed preferably contained from 0.1 to 35%, by weight, most preferably from 10 to 20% by weight, of the blowing agent combination according to the present invention, which comprises azodicarbonamide (ADC), one or more surface active agents and one or more metal compounds.

The resulting polymer foams are generally colourless and odourless and they have a fine, uniform pore structure combined with low unit weight and a smooth, colourless surface. It is to be regarded as yet another advantage of the blowing agent combination according to the present invention that foaming is accelerated. This advantage is particularly noticeable at high production speeds, where the desired unit weight of the foam is obtained within a shorter time. The blowing agent combination according to the present invention has the effect, for example, of making foam production more economical and improving the volume/time yield.

The polymers to be foamed may be mixed with various additives as required, such as fillers, pigments, flame retarding agents, antistatic agents, plasticizers, heat stabilizers, peroxides, age resistors, cross-linking agents and curing agents.

Production of the blowing agent combination according to the present invention, consisting of azodicarbonamide, surface active agents and metal compound, may be carried out at any stage in the preparation of the azodicarbonamide, e.g. before oxidation of hydrazodicarbonamide to azodicarbonamide using one of the conventional oxidizing agents, such as chlorine, bromine, iodine, hydrogen peroxide or sodium chlorate, or during or after oxidation. The substances may also be added while the components are being isolated by means of conventional filter apparatus, such as a pressure filter, rotary filter, suction box filter or filter press, or during or after washing of the solid substance. The blowing agent combination may also be applied in one of the conventional conveyor or mixing apparatus before drying or in a conventional mixing or grinding apparatus during or after drying. The above-mentioned components may be added separately or combined in a solution. If used separately, they may be added to the azodicarbonamide as solid substances, pastes or liquids. They may be added in a finely divided form, e.g. as a mist or droplets or as a compact mass. Suitable measures may be taken to ensure that the material is uniformly distributed over the surface of the azodicarbonamide.

EXAMPLE 1

1200 ml of water,
300 g of hydrazodicarbonamide (HDC) and
1.5 g of silicone defoamer
are introduced into a stirrer apparatus and the suspension obtained is oxidised with chlorine.

Oxidation of hydrazodicarbomate is completed after 3 hours and the consumption of 194 g of chlorine. The yellow solid substance is filtered off on a suction filter and dried in a vacuum drying cupboard.

Yield: 284 g≦96.3% based on the hydrazodicarbonamide (HDC).

EXAMPLE 2

Oxidation is carried out as in Example 1. 0.5 g of surface active fluorine compound corresponding to the following formula:

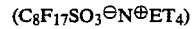

$(C_8F_{17}SO_3^{\ominus} N^{\oplus} ET_4)$ is used instead of silicone defoamer.

Yield: 282 g (95.6% based on HDC).
Particle diameter of ADC (μ): 43.

EXAMPLE 3

A solution in 100 ml of methanol of 0.05 g of the surface-active fluorine compound from Example 2 is added to 50 g of ADC. The solvent is then distilled off and ADC is recovered quantitatively.

Particle size of ADC ($\mu$): 14.5.

EXAMPLE 4

100 g of ADC are mixed with a solution of 0.1 g of silicone defoamer and 0.5 g of boric acid in 100 ml of water. The solvent is evaporated off.

Yield: 100 g (quantitative).
Particle diameter of ADC ($\mu$): 15.5

EXAMPLE 5

100 g of azodicarbonamide (anhydrous) are slowly introduced, with stirring, into 100 ml of methanol to which are added 0.5 g of sodium molybdate in 2 ml of water and 0.01 g of surface-active fluorine compound from Example 2 dissolved in a little water. When a uniform mixture has been obtained, the solid is freed from solvent.

Yield: quantitative.
Particle diameter for ADC ($\mu$): 24.

EXAMPLE 6

0.05 g of sodium molybdate in 50 ml of water, followed by 0.05 g of sodium stearate in 50 ml of water are added to 250 ml of an aqueous suspension containing 50 g of ADC. The suspension is then stirred for 10 minutes and the solid is filtered off and dried.

Yield: quantitative.
Particle diameter of ADC ($\mu$): 24.

EXAMPLE 7

0.1 g of titanyl sulphate and 0.1 g of surface-active fluorine compound from Example 2, each dissolved in 100 ml of water, are added dropwise to a suspension of 500 ml of azodicarbonamide in 15% hydrochloric acid (containing about 100 g of azodicarbonamide) which has been heated to 40° C. The suspension is then stirred for 10 minutes. The product is filtered off, washed with water until neutral, substantially freed from water by suction filtration and dried in a vacuum drying cupboard.

Yield: quantitative.
Particle size of ADC ($\mu$): 24.

EXAMPLE 8

0.5 g of sodium tungstate and 0.01 g of surface-active fluorine compound from Example 2 (instead of titanyl sulphate) are used in a manner analogous to Example 7.

Yield: quantitative.
Particle diameter of ADC ($\mu$) 24.

EXAMPLE 9

0.185 g of zinc oxide suspended in water, 0.065 g of boric acid and 0.005 g of surface active fluorine compound corresponding to the following formula: $C_8F_{17}SO_3K$, dissolved in water are added to 50 g of ADC in acetone. The solvent is removed by distillation and the solid substance is then dried.

Yield of ADC: quantitative.
Particle diameter of ADC ($\mu$): 24.

EXAMPLE 10

A suspension of 50 g of ADC, 0.5 g of sodium molybdate, 0.5 g of boric acid, 0.5 g of titanyl sulphate and 0.05 g of surface-active fluorine compound from Example 9 is stirred in water/acetone in a stirrer vessel. The solvent is then removed by distillation.

Yield (ADC): quantitative.
Particle diameter of ADC ($\mu$): 24.

EXAMPLE 11

0.1 g of zinc oxide, 0.05 g of boric acid and 0.005 g of surface active fluorine compound from Example 9 are added to 250 ml of an ADC suspension in 15% hydrochloric acid containing 50 g of ADC. The suspension is then stirred for 10 minutes and the ADC is filtered off, washed until neutral and dried.

Yield (ADC): quantitative.
Particle diameter of ADC ($\mu$): 24.
Proportion of zinc (%): 0.001.

EXAMPLE 12

An aqueous solution of sodium stearate is run into an ADC suspension in 15% hydrochloric acid so that the stearic acid precipitates on the Porofor in a quantity of from 0.1 to 0.2%. After a product which has been treated in this manner has been isolated in a filter assembly, it is fed into a continuously operating drier into which a suspension of 500 g of zinc oxide, 100 g of sodium molybdate, 170 g of boric acid and 10 g of surface-active fluorine compound from Example 2 in 10 l of water is introduced at a uniform rate depending on the quantity of ADC. After drying, the product contains the following quantities of metals:

Molybdenum (%): 0.034
Zinc (%): 0.18
Boron (%): 0.014

Whereever in the description, examples and claims the expression "foaming" occures it should be preferably understood and used in the sense "free foaming".

We claim:

1. Blowing agent combination for a free foaming process consisting essentially of azodicarbonamide doped with one or more surface-active agents in an amount of about 0.0001 to 2% by weight of azodicarbonamide and one or more metal compounds in an amount of about 0.0001 to 2% by weight of azodicarbonamide.

2. Blowing agent combination according to claim 1, characterised in that the surface-active agent used is a surface-active fluorine compound, alone or in combination with a fatty acid.

3. Blowing agent combination according to claim 1, characterised in that there are used a surface-active fluorine compound corresponding to the following general formula (I):

$$C_nF_{n+1}X^\ominus M^\oplus \tag{I}$$

wherein n represents an integer of from 1 to 10;
X represents a $SO_3$ or COO group; and
M represents an alkali metal ion, an alkaline earth metal ion or an ammonium ion corresponding to the following general formula (II):

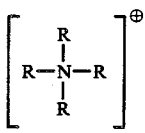

wherein

R represents an alkyl group having from 1 to 10 carbon atoms; and a fatty acid corresponding to the following general formula (III):

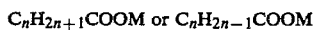

wherein n represents an integer of from 7 to 25; and

M represents hydrogen, sodium, potassium, ammonium, ½ magnesium, ½ calcium or ½ barium.

4. Blowing agent combination according to claim 1, characterised in that the metal compounds used are compounds of boron, molybdenum, tungsten, zinc, chromium, nickel, manganese, tin and/or titanium.

5. Process for the preparation of the blowing agent combination according to claim 1, characterised in that preparation of the blowing agent combination may be carried out in any phase of the preparation of the azodicarbonamide.

6. Blowing agent composition according to claim 1 where the metal compounds are boric acid, sodium borates, calcium borate, boron trioxide, perborates, including sodium perborate or zinc perborate, zinc borate, molybdenum oxide, sodium molybdate, ammonium molybdate, potassium molybdate, tungstic oxide, tungstic acid, sodium tungstate, calcium tungstate, ammonium tungstate, zinc oxide, zinc sulphate, zinc chloride, zinc nitrate, zinc bromide, nickel sulphate, nickel oxide, nickel chloride, nickel nitrate, manganese oxides, manganese chlorides, manganese sulphates, manganese nitrates, sodium, potassium and ammonium manganates, sodium, potassium and ammonium permanganages, tin chloride, tin oxide, tin dioxide, sodium and potassium stannates, titanium dioxide, sodium titanate, calcium titanate, titanium sulphate, titanium oxysulphate, titanium peroxy sulphate and titanium chlorides.

* * * * *